Feb. 6, 1951 G. T. BAKER 2,540,644

ALLOTTER SWITCH FOR PREASSIGNING IDLE FINDER SWITCHES

Original Filed Nov. 11, 1944 5 Sheets-Sheet 1

INVENTOR.
GEORGE THOMAS BAKER

BY Chas. W. Candy

ATTORNEY

INVENTOR.
GEORGE THOMAS BAKER

BY Chas. W. Candy.

ATTORNEY

Feb. 6, 1951 G. T. BAKER 2,540,644

ALLOTTER SWITCH FOR PREASSIGNING IDLE FINDER SWITCHES

Original Filed Nov. 11, 1944 5 Sheets-Sheet 3

INVENTOR.
GEORGE THOMAS BAKER

BY

ATTORNEY

Feb. 6, 1951 G. T. BAKER 2,540,644

ALLOTTER SWITCH FOR PREASSIGNING IDLE FINDER SWITCHES

Original Filed Nov. 11, 1944 5 Sheets-Sheet 4

INVENTOR.
GEORGE THOMAS BAKER

BY

ATTORNEY

Feb. 6, 1951 G. T. BAKER 2,540,644

ALLOTTER SWITCH FOR PREASSIGNING IDLE FINDER SWITCHES

Original Filed Nov. 11, 1944 5 Sheets-Sheet 5

INVENTOR.
GEORGE THOMAS BAKER

BY *Chas. L. Cassidy*

ATTORNEY

Patented Feb. 6, 1951 2,540,644

UNITED STATES PATENT OFFICE 2,540,644

ALLOTTER SWITCH FOR PREASSIGNING IDLE FINDER SWITCHES

George Thomas Baker, Liverpool, England, assignor to Automatic Electric Laboratories, Inc., Chicago, Ill., a corporation of Delaware Original application November 11, 1944, Serial No. 562,940. Divided and this application August 3, 1948, Serial No. 42,164. In Great Britain September 16, 1944

4 Claims. (Cl. 179—18)

Figure 1:
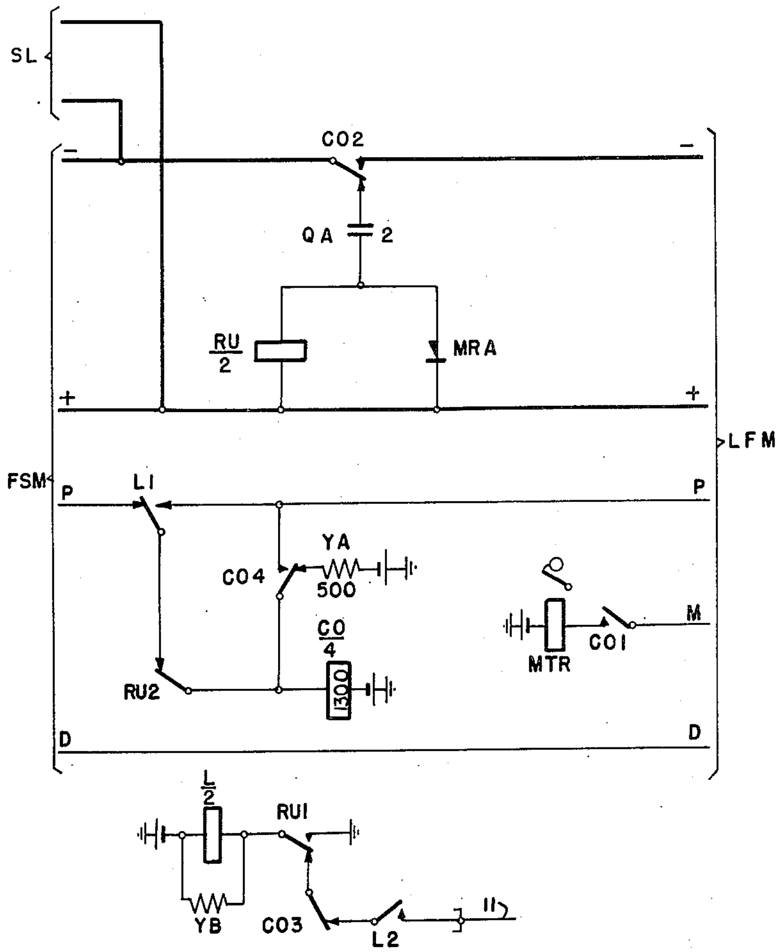

The present invention relates in general to telephone systems, and more particularly to automatic telephone systems employing finder switches for connecting calling lines to numerical switches.

This application is a division of the application Serial No. 562,940, filed November 11, 1944, now Patent No. 2,508,636, dated May 23, 1950.

It is an object of the invention to provide in a telephone system of the character described, new and novel circuit means for accomplishing the various connections.

Another object of the invention is to provide improved means for pre-assigning idle line-finders whereby an assigned line-finder is allotted sufficient time in a new and novel manner for finding a calling line before the line-finder allotter pre-assigns another line-finder, and whereby the line-finder allotter passes over a line-finder in prior use at an increased rate of speed.

A feature of the invention resides in the new and novel arrangement wherein a certain number of terminals of the line-finder allotter are associated with a pre-assigned line-finder, and wherein means is provided for causing the line-finder allotter to successively test said number of terminals in order that the pre-assigned line-finder will have sufficient time to find a calling line before the line-finder allotter pre-assigns another line-finder.

There are other objects and features of the invention having to do for the most part with details in carrying out the foregoing. The various objects and features of the invention will be understood best upon the perusal of the following description of the accompanying five (5) sheets of drawings which show a preferred embodiment of the invention.

The embodiment illustrated in the drawings relates to an improved and simple telephone system suitable for rural areas, and which will operate over any subscriber's line which is good enough to enable manual signalling to be performed, i. e., good enough to enable a relay at an exchange to be operated or released.

Use is made of the automatic selecting principle disclosed in the application of Reginald Taylor and George Thomas Baker, Serial No. 537,564 filed May 27, 1944, now Patent No. 2,421,169, dated May 27, 1947, which does not necessitate reception of dialled impulses or the like from a calling point, the selection of any one of a number of lines being initiated in response to a signal from a calling point, and proceeding until terminated by a further signal from the calling point when the desired line is encountered, the progress of the selecting operation being indicated continuously at the calling point, for instance audibly.

In the subscribers' telephone instruments, which in the ensuing circuit description are assumed to be of the magneto type, a single-break push key short-circuited by a condenser is inserted in series with the line and may be fitted, if required, external to the telephone either as a wall mounting or as a loose cord connected item lying on a desk. This unit requires very little maintenance and that of an almost unskilled nature.

The exchange is called by lifting the handset and turning the generator, whereupon at the end of the alternating current generation a finder/connector link is caused to associate itself with the calling line and is then held from the calling party's loop. Certain types of telephones might require a minor wiring modification to ensure this procedure being effective. The receiver is then placed to the ear and the signalling button is depressed. Short pulses of tone which are delivered from the link as its connecting switch performs its selecting operation are now heard in the receiver and these are counted until a number corresponding to the wanted line has been heard. The button is then released and ringing tone or busy tone will be heard exactly as in normal automatic working. The pulses are sent out at a comparatively slow rate so that no difficulty is experienced in stopping the connector at the appropriate point. This method will function quite satisfactorily on loops of up to 3000 ohms, and since the usual A, B and C dialling relays are unnecessary and the magnets have ample time to energize, the system is very robust.

Referring now to the drawings,

Fig. 1 shows a line circuit for a telephone station equipped with a magneto telephone instrument.

Figure 2:
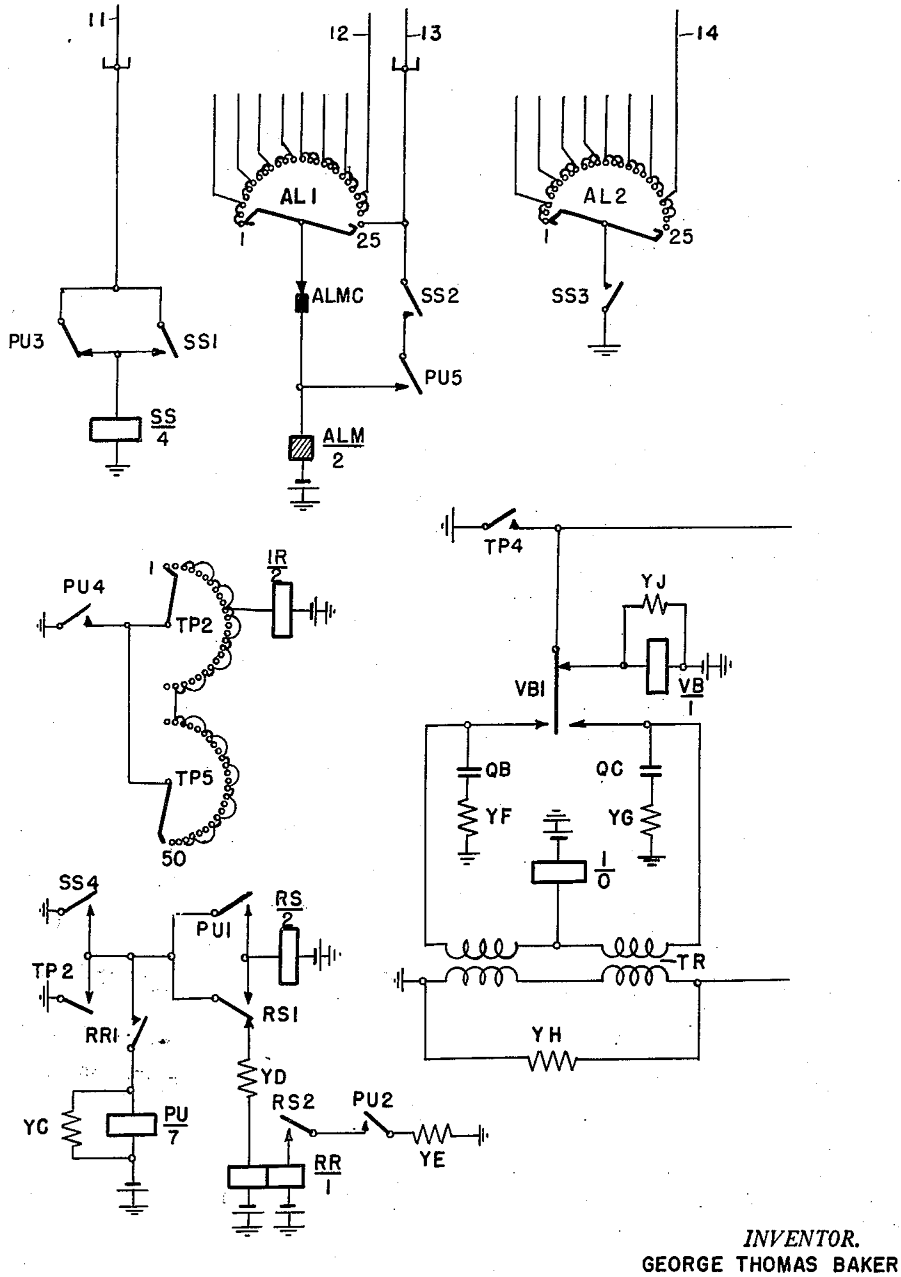
Figure 3:
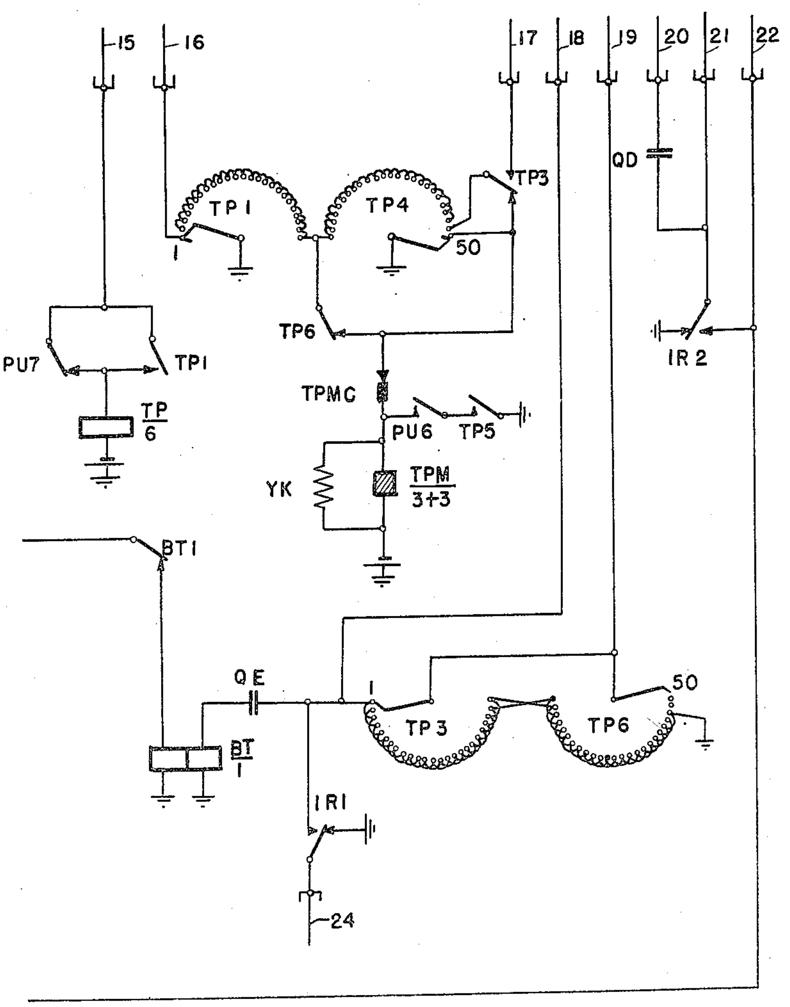

Figs. 2 and 3 when arranged side by side together show the circuit of the common equipment required for allotting the various finder-connector link circuits.

Figure 4:
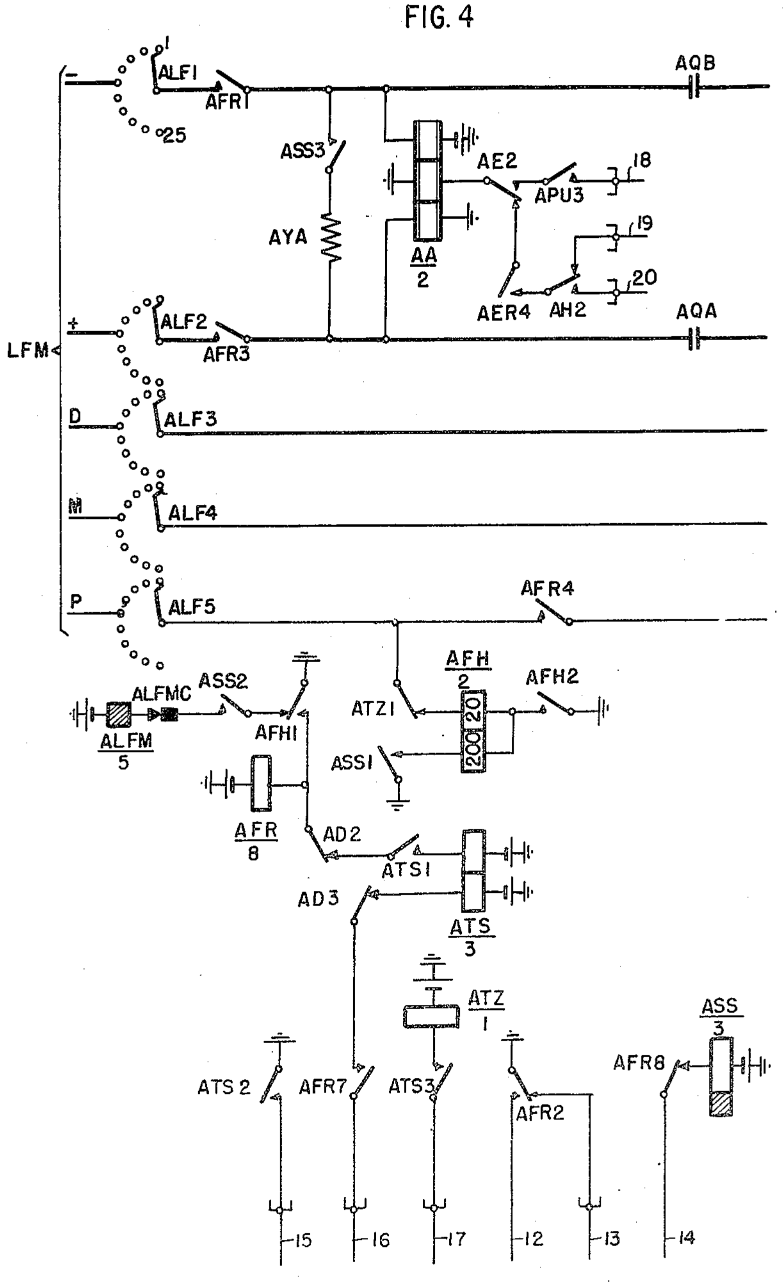
Figure 5:
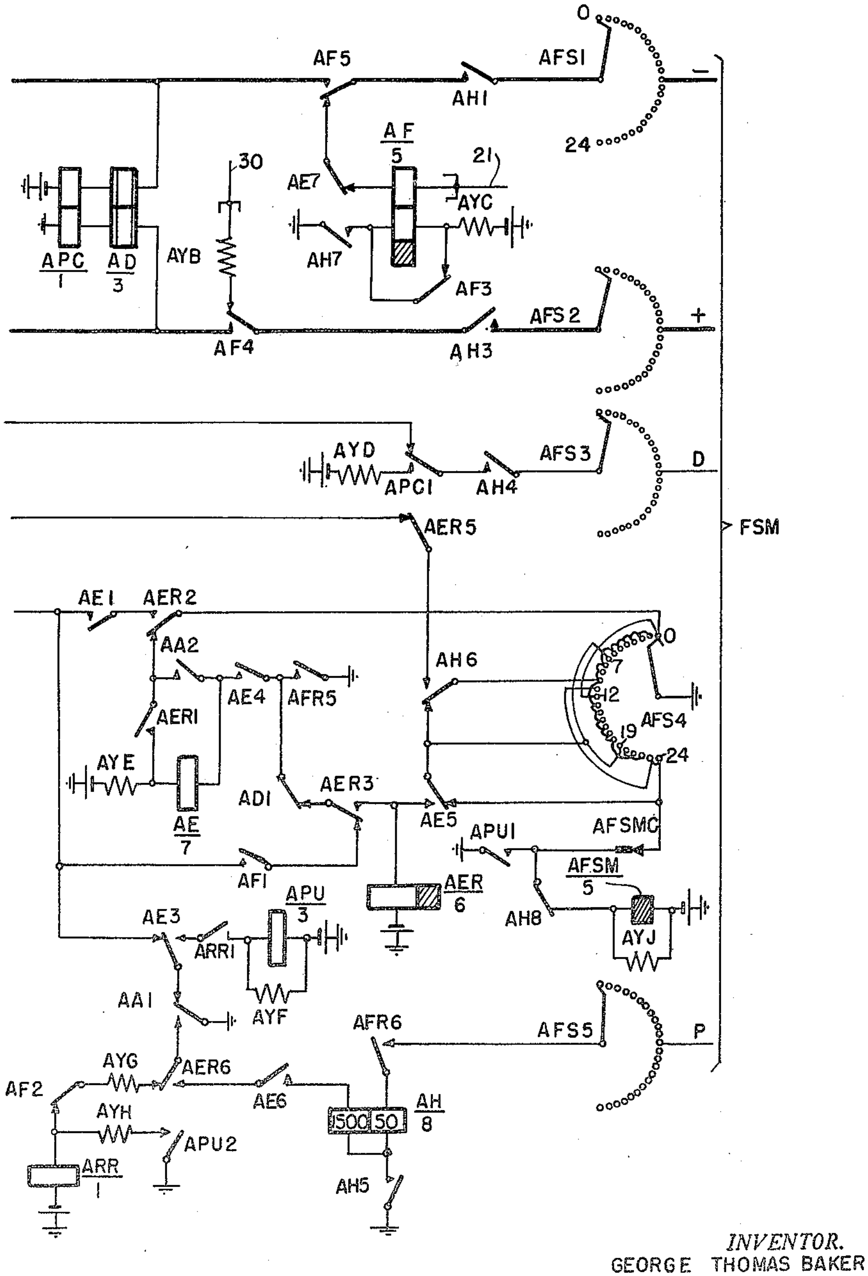

Figs. 4 and 5 when arranged side by side together show the details of a finder-connector link circuit.

It should be understood at this time that while the embodiment of the present invention disclosed and described in this specification includes switches of the well-known 25-contact rotary lineswitch type, the invention is not limited to the particular form shown but may utilize larger bank-capacity switches to increase the number of station lines. It should be further understood that while a plurality of battery connections are shown in the drawings, they are preferably the same battery.

Considering now the detailed circuit operation, typical values for certain relay windings and resistors are given for general guidance, the supply voltage being assumed to be 50 volts.

Referring first to the subscriber's line circuit of Fig. 1, when the subscriber lifts his receiver to loop his line SL and then turns the handle of the generator, relay RU, which is responsive to alternating current by virture of capacitor QA and rectifier MRA, is operated and operates relay L but prevents its contacts being effective. When the ringing has ceased, the line SL remains looped and relay L remains locked via contacts L2 and common lead 11 to a battery-connected start relay SS in the common equipment, Figs. 2 and 3, this circuit extending a start condition to the common equipment which causes a link line finder to hunt for the battery marking placed on the P bank in the finder multiple LFM by contacts L1. When the finder reaches the line, relay CO is energized over the P conductor and disconnects relay L and extends the line SL through to the link.

On an incoming call, relay CO is operated directly over the connector multiple FSM from the P normal lead to disconnect relay RU. The 500-ohm resistance across CO is to ensure the quick and effective action of the switching relay in the calling link.

Considering now the common equipment of Figs. 2 and 3, the allotter uniselector AL, Fig. 2, which gives access to up to eight links, will be normally resting on a free link since the earth extended back from busy links over leads such as 12 causes the uniselector magnet ALM to self-drive via interrupter contacts ALMC over busy outlets, each of which connects with three successive contacts on the AL switch banks. If all the links are busy, earth is removed from the overflow common 13 and so causes the uniselector AL to rest on the last contact.

The operation of relay SS from a calling line circuit extends an earth via bank AL2 to cause the preselected link to hunt for the calling line. Relay SS at contacts SS4 also causes the rhythm relay RR, of the type disclosed in British Patent No. 518,877 to swing across and make its single pair of contacts. This energizes relay PU which at contacts PU5 completes a circuit from earthed lead 13 for the allotter magnet ALM and at contacts PU1 energizes relay RS which at contacts RS1 locks up and breaks the original pull-over circuit of relay RR and at contacts RS2 gives it a pulse in the reverse direction to cause it to swing back and so to break the circuit of relay PU. The swinging action of relay RR is timed at .75 of a second and at each swing a pulse is given to uniselector magnet ALM and also to the rhythm relay itself to keep it swinging. Hence, in not less than 1.5 seconds the allotter will move off the selected link. This time is sufficient for the link finder to make one complete revolution, and finding should be achieved by that time. If not, this indicates a fault condition and the need for a second link to be automatically started up which occurs when the allotter steps to the next link. If this or any succeeding link is busy, it is passed over rapidly by self-interrupted stepping. If finding does not take place normally, earth is extended on to bank AL1 from the link and causes the allotter to move on to the next outlet.

The rhythm relay RR, by the intermediary of relay PU, also controls the stepping of the time pulse uniselector TP, Fig. 3. This stepping is initiated on the operation of relay TP from a start condition over lead 15 from the link circuit and is subsequently effected by means of contacts PU6 and TP5. While switch TP is in the home position, earth is applied by wiper TP1 to the "S" pulse lead 16 and in stepping at the rate of one step per .75 second wiper TP4 reaches the Z pulse contact 49 extending to the "Z" lead 17 after 48 steps, i. e. 36 seconds. Relay TP at contacts TP4 also provides the ringing and tone start by energizing the ringing vibrator relay VB and the busy tone relay BT, while at contacts TP2 it maintains the RR, PU and RS interacting circuit independently of contacts SS4.

An S pulse is a ground application to lead 16 by way of wiper TP1 (Figure 3) when the time pulse uniselector is in the home position, and is for the purpose of operating relay ATS of the hunting finder by way of contacts AFR7 when the finder wiper ALF5 has seized the calling line and thereby caused the operation of relay AFR. Relay ATS applies ground potential to lead 15 by way of contacts ATS2 to operate relay TP, and relay TP through contacts TP5 and PU6 completes an operating circuit to magnet TPM which is time controlled by the interaction of RR, PU and RS. An S pulse may, therefore, be considered as a starting pulse for the time pulse uniselector (Figure 3). A Z-pulse is a ground application delivered by way of contacts TP3 (Figure 3) when wiper TP4 has reached contact position 49, and is for the purpose of causing relay ATZ of the occupied finder to thereupon operate. If the calling subscriber fails to signal by this time, or if the called subscriber has not answered by this time, relay ATZ in operating will open the holding circuit of finder relay AFH at contacts ATZ1, thereby causing a forced release. A Z-pulse may, therefore, be considered as a pulse which terminates a predetermined time interval for causing a forced release under the conditions outlined in this paragraph.

Vibrating relay VB in known manner supplies ringing current to the "continuous ringing" lead 22, while relay BT supplies "number unobtainable" tone to lead 18. Furthermore since the switch TP steps once every .75 second alternate contacts on banks TP3 and TP6 can be used to break up the continuous tone provided by relay BT into the off and on tone used for busy, which is applied to common lead 19. Contacts PU4 and wipers and banks TP2 and TP5 operate relay IR for two brief periods of approximately 0.3 second in each three second cycle, and this relay at contacts IR1 provides a verification tone over common lead 24 and at contacts IR2 provides interrupted ringing current over common lead 21 and also interrupted ringing tone via capacitor QD over common lead 20.

Referring now to the link circuit of Figs. 4 and 5, when the link is seized from the allotter by the extension of earth over lead 14, relay ASS is energized and thereupon at contacts ASS1 provides a testing circuit for relay AFH, at contacts ASS2 provides a driving circuit for the line finder switch magnet ALFM and at contacts ASS3 brings up relay AA. Relay AA in operating, at contacts AA1, Fig. 5, causes rhythm relay ARR to swing its armature away from its contacts ARR1, as distinct from relay RR in Fig. 2 which closed its contacts on energization, and at contacts AA2 brings up relay AE from either of the two home positions 0 or 12 of the connector switch bank AFS4. Relay AE, in operating, at contacts AE3 prepares an operating circuit for relay APU.

When the finder switch ALF reaches the calling line which is marked by battery potential on bank ALF5 by way of resistor YA and relay CO, Fig. 1, relay AFH energizes over its two windings in series and thereupon at contacts AFH2 applies guarding and holding potential to the outlet seized, while at contacts AFH1 it brings up relay AFR and disconnects the switch driving circuit. Relay AFR in operating, at contacts AFR1 and AFR3 switches through the speaking conductors to relay AA, at contacts AFR2 disconnects earth from the overflow common lead 13 and also applies earth to lead 12 so as to step the allotter switch in the common equipment on to another free link in readiness for further calls, at contacts AFR5 completes an alternative holding circuit for relay AE, at contacts AFR7 energizes relay ATS from the time pulse "S" lead 16 and at contacts AFR8 disconnects relay ASS. Thereupon at contacts ASS3 the local holding circuit for relay AA is opened, but this relay now remains held over the calling party's loop. Relay ATS, in operating, locks over its upper winding and at contacts ATS2 applies earth to the time pulse and ringing current and tone generation start lead 15, while at contacts ATS3 it connects relay ATZ on to the "Z" lead 17.

When the subscriber operates his signalling button to initiate the selecting operation, the direct current calling loop is opened and relay AA releases, whereupon at contacts AA1 relay ARR is allowed to swing back and make its contacts ARR1 thus operating relay APU. Relay APU in operating, at contacts APU1 energizes the connector switch magnet AFSM and at contacts APU2 gives a small energization to relay ARR to ensure the continuation of the swinging movement, while at contacts APU3 it extends "number unobtainable" tone via common lead 18 and the windings of relay AA to the calling party, this tone being utilized for selective signalling purposes. When rhythm relay ARR opens its contacts, relay APU releases and de-energizes the connector switch magnet and at the same time opens the tone circuit, the subscriber having received a pulse of tone corresponding to one step of the connector switch. Relay APU in releasing de-energizes relay ARR which thereupon swings back to reclose its contacts ARR1 and the cycle of operations thus repeats itself, the calling subscriber receiving a tone pulse for each step of the connector switch. Immediately the connector switch leaves its home position, wiper AFS4 extends earth via contacts AH6 and AE5 to bring up relay AER, and this relay at contacts AER1 prepares for the short-circuiting of relay AE, at contacts AER3 locks itself and at contacts AER6 prepares a testing circuit for relay AH.

When the signalling button is released after a number of tone pulses have been received appropriate to the number required, relay AA reoperates and at contacts AA1 opens any further circuit for relay APU and so halts the stepping, while at contacts AA2 it short-circuits relay AE which commences to release slowly. During the release time of relay AE, a testing circuit is completed via contacts AA1, AER6, AE6 and AFR6 for relay AH over wiper and bank AFS5 on to the P normal lead of the called subscriber.

If this subscriber is free, relay AH energizes in series with the called subscriber's cut-off relay CO and resistor YA, Fig. 1 and on the release of relay AE initiates ringing of the called party's bell via common lead 21 and relay AF, a return circuit being completed via resistor AYB and lead 30 to battery, while at contacts AH2 ringing tone from common lead 20 is supplied to the calling party.

When the called party replies, relay AF operates to trip the ringing and switch the speaking leads through, whereupon relay AD operates over the called party's loop in series with the differential relay APC which is non-operative in this condition. Relay AD in operating, at contacts AD2 and AD3 opens the time pulse circuit for relay ATS and at contacts AD1 opens the circuit of relay AER which on restoring after its slow period at contacts AER4 opens the ringing tone circuit and at contacts AER5 extends earth for metering from wiper and bank AFS4 over contacts AH6 to the M lead of the calling party's line circuit.

If the called subscriber is busy when the connector comes to rest on his line, relay AH will fail to operate during the release period of relay AE and hence on the release of relay AE, busy tone will be returned to the calling party via lead 19 and contacts AH2, AER4 and AE2.

Considering now the various possible release conditions for the link, if the calling party hangs up without signalling, this is equivalent to operating but not releasing the signalling button. Under this condition the connector switch continues to step until it arrives at its next home position, say 12 in this instance, whereupon a circuit is completed to shunt down relay AFH via wiper and bank AFS4 and contacts AER2, AE1 and AFR4. Relay AFH, in releasing, releases relay AFR which brings down relays AE and AER and all relays are then normal.

Under normal release conditions, when the calling party hangs up, relay AE will already be normal so that relay AA in releasing will bring down relay AFH by short-circuiting via contacts AA1, AE3 and AFR4. Relay AFH, in releasing, brings down relay AFR which then releases relays AH, AF and AD. On the release of relay AH, a self-interrupted circuit is completed for magnet AFSM over wiper AFS4, and the connector switch is advanced to its next normal position. In case the called subscriber hangs up first, relay AD in releasing will at contacts AD1 extend a short-circuiting earth back via contacts AFR5, AD1, AER3, AF1 and AFR4 to relay AFH with similar results as for the calling party release.

Under time pulse release conditions, if the calling subscriber has failed to signal by the time the Z pulse is received over lead 17, or if the called subscriber has not answered in this time, relay ATZ in operating will release relay AFH at contacts ATZ1, and the other relays then release in turn.

It should be understood that while one embodiment of the invention is disclosed and described in this specification, the invention is not limited to the particular form or application shown, but is entitled to the equivalents thereof within the scope of the appended claims.

What is claimed is:

1. In a telephone system, lines, idle finders having access to said lines, a source of potential, a progressively movable automatic allotter switch having a contact bank, the contacts of said bank being divided into groups of adjacent contacts, each of said groups of contacts corresponding to one of said finders, means for causing said allotter to pre-assign an idle finder, said allotter stopping on the first contact of said group corresponding to said pre-assigned finder, means responsive to the initiation of a call over one of said lines for causing said pre-assigned finder to hunt said calling line, means responsive to said initiation of said call for stepping said allotter from said first contact successively to the remaining contacts of said one group at a predetermined rate while said pre-assigned finder is hunting said calling line, said rate of stepping of said allotter permitting said hunting finder to test all said lines, if necessary, before said allotter reaches the last contact of said one group, means responsive to said hunting finder finding said calling line for causing said hunting finder to seize said calling line, means responsive to said seizure of said calling line for connecting said potential to the last contact of said one group, and means responsive to said allotter contacting said potential for causing said allotter to pre-assign another idle finder.

2. A telephone system as claimed in claim 1 and means for stepping said allotter over the contacts of a group corresponding to an occupied finder at a faster rate than that at which said allotter is stepped over the contacts of said one group corresponding to said first mentioned pre-assigned finder.

3. In a telephone system, lines, idle finders having access to said lines, a progressively movable automatic allotter switch having a contact bank, the contacts of said bank being divided into groups of adjacent contacts, each of said groups of contacts corresponding to one of said finders, means for causing said allotter to pre-assign an idle finder, said allotter stopping on the first contact of said group corresponding to said pre-assigned finder, means responsive to the initiation of a call over one of said lines for causing said pre-assigned finder to hunt said calling line, means responsive to said initiation of said call for stepping said allotter from said first contact of said one group across the remaining contacts of said one group at a predetermined uniform rate while said pre-assigned finder is hunting said calling line, said rate of stepping of said allotter making it possible for said hunting finder to complete a full hunting cycle of all said lines before said allotter reaches the last contact of said one group, means responsive to said allotter reaching the last contact of said one group after said hunting finder has completed a full hunting cycle and failed to find and seize said calling line for stepping said allotter from the last contact of said one group, and means for disabling said hunting finder in response to said allotter stepping from the last contact of said one group.

4. The telephone system claimed in claim 3 together with means responsive to said allotter stepping from the last contact of said one group for causing said allotter to assign another idle finder to hunt said calling line.

GEORGE THOMAS BAKER.

REFERENCES CITED

The following references are of record in the file of this patent:

UNITED STATES PATENTS

| Number | Name | Date |
|---|---|---|
| 1,256,500 | Clausen | Feb. 12, 1918 |
| 1,456,507 | Lundell | May 29, 1923 |
| 1,600,358 | Puckette | Sept. 21, 1926 |
| 1,799,485 | Stehlik | Apr. 7, 1931 |
| 2,421,169 | Taylor | May 27, 1947 |